US012767853B2

(12) United States Patent
Zha et al.

(10) Patent No.: US 12,767,853 B2
(45) Date of Patent: Oct. 20, 2026

(54) HIGH-TEMPERATURE SELF-CROSSLINKING FLUORINE-CONTAINING POLYARYLETHERKETONE AND PREPARATION METHOD THEREOF, AND COATING MATERIAL AND PREPARATION METHOD THEREOF

(71) Applicant: Tongling Jingda Special Magnet Wire Co., Ltd., Tongling (CN)

(72) Inventors: Chao Zha, Tongling (CN); Xiao Li, Tongling (CN); Yun Zhao, Tongling (CN); Hao Chang, Tongling (CN); Xiaoguang Jiao, Tongling (CN); Qingze Jiao, Tongling (CN); Caihong Feng, Tongling (CN); Hansheng Li, Tongling (CN); Daxin Shi, Tongling (CN); Yaoyuan Zhang, Tongling (CN); Bing Qin, Tongling (CN); Jun Zhao, Tongling (CN)

(73) Assignee: Tongling Jingda Special Magnet Wire Co., Ltd., Tongling (CN)

( * ) Notice: Subject to any disclaimer, the term of this patent is extended or adjusted under 35 U.S.C. 154(b) by 710 days.

(21) Appl. No.: 18/210,669

(22) Filed: Jun. 16, 2023

(65) Prior Publication Data

US 2024/0043716 A1 Feb. 8, 2024

Related U.S. Application Data

(63) Continuation of application No. PCT/CN2022/131816, filed on Nov. 15, 2022.

(30) Foreign Application Priority Data

May 7, 2022 (CN) ........................ 202210492600.9

(51) Int. Cl.
*C09D 171/00* (2006.01)
*C08G 65/40* (2006.01)
(Continued)

(52) U.S. Cl.
CPC ....... *C09D 171/00* (2013.01); *C08G 65/4056* (2013.01); *C08G 65/4087* (2013.01);
(Continued)

(58) Field of Classification Search
CPC .......... C09D 171/00; C09D 7/20; C09D 7/42; C09D 7/65; C08G 65/4056; C08G 65/4087; C08G 65/4093
See application file for complete search history.

(56) References Cited

U.S. PATENT DOCUMENTS

2005/0282919 A1* 12/2005 Cao ........................ H01B 1/122 521/27

FOREIGN PATENT DOCUMENTS

| | | | |
|---|---|---|---|
| CN | 1266861 | A | 9/2000 |
| CN | 101045786 | A | 10/2007 |

(Continued)

*Primary Examiner* — Catherine S Branch
*Assistant Examiner* — Andrea Wu

(57) ABSTRACT

The present application relates to the technical field of polyaryletherketone, and discloses a preparation method for a coating material containing high-temperature self-crosslinking fluorine-containing polyaryletherketone. A molecular chain of the high-temperature self-crosslinking fluorine-containing polyaryletherketone contains two crosslinking groups of a styrene group and a thioether group, and its structural formula is:

(Continued)

-continued

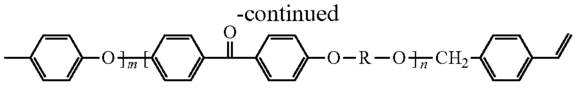

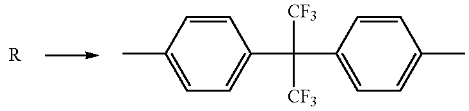

Herein, the value range of m is 1-40%, the value range of n is 60-99%, and R is a group that removes a phenolic hydroxyl group from hexafluorobisphenol A. In the high-temperature curing process after film coating, the crosslinking reaction occurs to form a crosslinked polymer coating layer, thereby a coating surface with good moisture and heat resistance, wear resistance, and low friction coefficient is formed.

7 Claims, 1 Drawing Sheet

(51) Int. Cl.

| | |
|---|---|
| ***C09D 7/20*** | (2018.01) |
| ***C09D 7/42*** | (2018.01) |
| ***C09D 7/65*** | (2018.01) |

(52) U.S. Cl.

CPC .......... *C08G 65/4093* (2013.01); *C09D 7/20* (2018.01); *C09D 7/42* (2018.01); *C09D 7/65* (2018.01)

(56) References Cited

FOREIGN PATENT DOCUMENTS

| | | | |
|---|---|---|---|
| CN | 101067021 | A | 11/2007 |
| CN | 102139263 | A | 8/2011 |
| CN | 113604140 | A | 11/2021 |
| EP | 0106023 | A2 | 4/1984 |

* cited by examiner

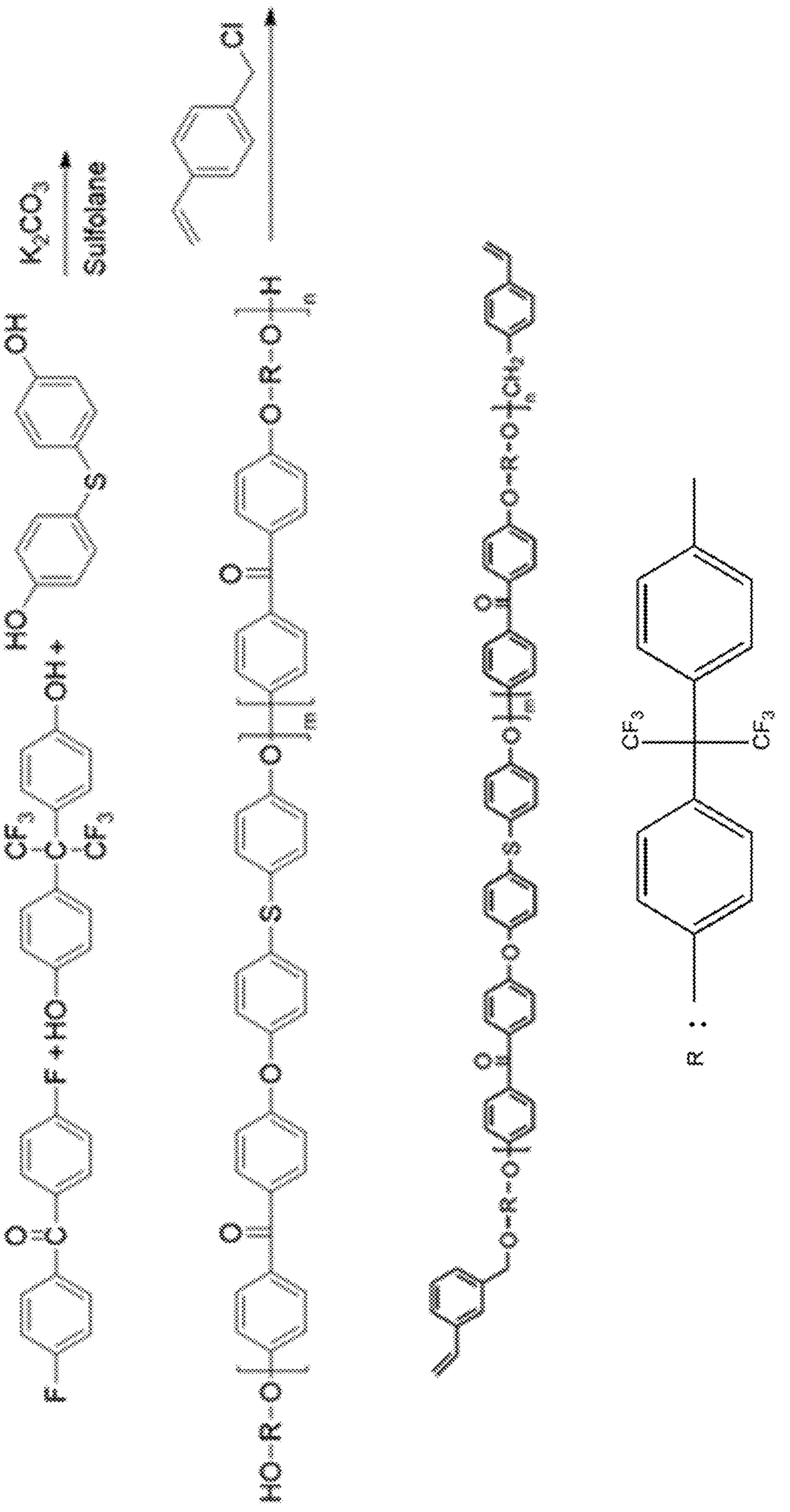
$K_2CO_3$
Sulfolane

HIGH-TEMPERATURE SELF-CROSSLINKING FLUORINE-CONTAINING POLYARYLETHERKETONE AND PREPARATION METHOD THEREOF, AND COATING MATERIAL AND PREPARATION METHOD THEREOF

CROSS-REFERENCE TO RELATED APPLICATIONS

The present application is a continuation application of PCT application No. PCT/CN2022/131816 filed on Nov. 15, 2022, which claims the benefit of Chinese Patent Application No. 202210492600.9 filed on May 7, 2022. The contents of all of the aforementioned applications are incorporated by reference herein in their entirety.

TECHNICAL FIELD

The present application relates to the technical field of polyaryletherketone, in particular to a high-temperature self-crosslinking fluorine-containing polyaryletherketone and a preparation method thereof, and a coating material including the high-temperature self-crosslinking fluorine-containing polyaryletherketone and a preparation method thereof.

BACKGROUND

An enameled wire is made by winding a metal wire, such as copper, aluminum, and manganese copper alloy, coated with high-molecular insulated paint (enameled wire paint) on the surface, and it is widely used in electromagnetic coils, industrial engines and other apparatuses. With the rapid development of industrial appliances, household appliances, telecommunications, electronic products and the like, the market demand for the enameled wire is rapidly expanded in recent years. With the development of electrical appliance motors towards small size and high power, as well as the high standard requirements in certain special fields, higher requirements are put forward for the enameled wire. For example, some aviation motors require long-term operations in environments with a temperature of above 200° C., or require instantaneous operating temperatures up to about 420° C., and some oil cooled motors require long-term operations in lubricating oil containing a small amount of water at high or low temperatures. Therefore, the research, on developing a new-type of the enameled wire with good moisture and heat resistance, has practical significance.

The performance of the enameled wire mainly depends on the performance and quality of the enameled wire paint, and the enameled wire paint is a type of the insulated paint having special purposes. The enameled wire paint is one of core components of insulation materials used in the electrical appliance motor, it is a coating material that may generate a good insulation layer between wires in a motor winding, and is mainly used for outer layers of a bare copper wire, an alloy wire, and a glass fiber covered wire of various wire diameters, as to improve and stabilize the performance of the enameled wire. In the various electrical appliance motors, there are high requirements for the performance of the enameled wire paint. For example, the enameled wire paint should have high mechanical strength, good compatibility with impregnating paint, and be able to meet the requirements of higher heat resistance, impact resistance, and oil resistance and the like. Especially in large-type transformers, due to stronger currents usually applied in internal windings and relatively harsh environments, there are higher requirements for the performance of the enameled wire paint covering the wires.

In recent years, the high-temperature-resistant insulating coating material widely used is mainly polyimide, which is the insulated paint with the highest heat resistance rating in organic enameled wires, whose long-term operating temperature may reach above 220° C., and it has high heat resistance, good solvent resistance and refrigerant resistance. However, it is easily hydrolyzed at high temperatures and has poorer resistance to moisture and heat, thus its applications are limited in certain fields.

Polyaryletherketone is a type of high-performance engineering plastic with excellent comprehensive performance, has outstanding advantages of high heat resistance rating, wear resistance, fatigue resistance, impact resistance, damp heat resistance, radiation resistance and chemical stability and the like, and is widely used in the fields such as aerospace, electronics, machinery, information, automobiles and nuclear industry. However, due to the poor solubility of the polyaryletherketone, a traditional solution method may not be used to prepare the enameled wire, and only a melting processing method may be used. Chinese patent CN102139263A discloses a using method for a polyether etherketone thermal conductive insulation coating material, which involves directly coating the prepared uncooled polyether etherketone thermal conductive insulation coating material on a substrate material, drying at a high temperature, and then vacuum-sintering, to obtain the substrate material coated with the polyether etherketone.

Fluorine-containing polyaryletherketone, as a fluorine element is introduced into a main chain or a side chain, and the thermal stability may be maintained while the solubility is improved, may be used in the coating material. Chinese patent CN101067021A discloses a nano-alumina modified (fluorine-containing) polyaryletherketone polymer and preparation of nano-ceramic film paint thereof, the nano-alumina modified (fluorine-containing) polyaryletherketone polymer is used as a matrix resin to prepare the nano-ceramic film paint, the comprehensive performance is good and the cost-performance ratio is low. CN202111023864.1 discloses a two-component coating material of fluorine-containing polyaryletherketone. Compared with other polyaryletherketone coating materials, this coating material forms a cross-linked polymer coating layer after film formation and curing, and forms a coating surface with good wear resistance, low friction coefficient, anti-contamination, flame retardancy and high temperature resistance. However, due to addition of a catalyst to coating material components, the electrical insulation performance of the prepared enameled wire paint is decreased to some extent, and before painting, it is necessary to add a double-component mixing and painting working procedure, so that the process is complex. In large-scale practical production, the production cost is inevitably increased.

Therefore, it is necessary to develop a new polyaryletherketone material in allusion to the above defects or deficiencies.

SUMMARY

A technical problem to be solved by the present application is that: an existing polyimide high-temperature-resistant coating material is poor in moisture and heat resistance, and the insulativity of a two-component fluorine-containing polyaryletherketone coating layer is reduced, the painting process is complex and the cost is high.

In order to solve the above technical problem, the present application provides a preparation method for a coating material containing high-temperature self-crosslinking fluorine-containing polyaryletherketone. A molecular chain of the fluorine-containing polyaryletherketone contains two crosslinking groups of a styrene group and a thioether group, the styrene group serves as an end capping group, and the thioether group serves as a chain segment group; and the high-temperature range of the high-temperature self-crosslinking is 80-350° C. The polyaryletherketone containing two crosslinking groups of the styrene group and the thioether group may be dissolved in a conventional organic solvent to prepare a coating material or paint, and it is linear at a low temperature (25-80° C.) and does not undergo a crosslinking reaction. In the high-temperature curing process after film coating, the crosslinking reaction occurs to form a crosslinked polymer coating layer, thereby a coating surface with good moisture and heat resistance, wear resistance, and low friction coefficient is formed. An enameled wire prepared with this coating material may still maintain good electrical insulativity in harsh working environments of high temperature, high pressure, and high humidity, and meanwhile, the production cost may be reduced.

The present application provides a preparation method for high-temperature self-crosslinking fluorine-containing polyaryletherketone, and it is performed according to the following steps.

S1, synthesis of fluorine-containing polyaryletherketone containing two crosslinking groups of styrene group and thioether group:

Raw materials 4,4'-difluorobenzophenone, hexafluorobisphenol A, 4,4'-dihydroxy p-phenylsulfide (crosslinking agent), anhydrous potassium carbonate, and reactive solvent NMP (N-methylpyrrolidone) are added sequentially to a container equipped with a mechanical stirring device, a thermometer, a water separator, and a nitrogen gas fed, it is stirred and the temperature is raised to 115-125° C., it is reacted for 2-3 h to remove water generated during the reaction, and then the temperature is raised to 175-190° C., and it is continuously reacted for 2.5-3.5 h; and after a high-temperature polymerization reaction is completed, a reaction system is cooled to a room temperature, 4-vinylbenzyl chloride is added and stirred at the room temperature for 20-25 h until the reaction is completed, a reaction product is poured into deionized water, the product is crushed after being cooled, it is filtered after being washed with ethanol and deionized water, and then it is dried with blast air at 60° C. for 4-8 h, and vacuum-dried at 55-65° C. for 16-20 h, to obtain high-temperature self-crosslinking fluorine-containing polyaryletherketone white polymer powder with the styrene group and the thioether group in the molecular chain, and the yield is 95%. The 4-vinylbenzyl chloride acts as a crosslinking agent by a vinyl group contained, and opens a π bond of the vinyl group by the thermal energy action to generate a free radical, thereby the crosslinking of different molecular chains is caused. The thioether group also undergoes a similar thermal crosslinking reaction. The 4-vinylbenzyl chloride may also be replaced with 4-vinylbenzyl bromide or p-fluorostyrene.

A reaction formula for the preparation process of the high-temperature self-crosslinking fluorine-containing polyaryletherketone containing two crosslinking groups of the styrene group and the thioether group is as follows:

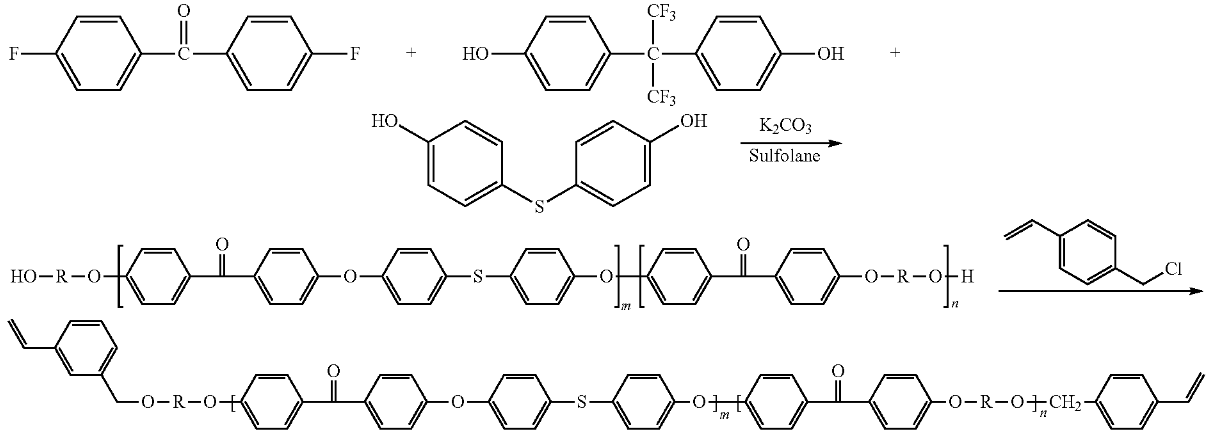

Herein, the value range of m is 1-40%, and the value range of n is 60-99%. Preferably, the fluorine-containing polyaryletherketone may be randomly copolymerized, so only the proportion of the content of each repeated group in the total length m+n of the molecular chain is calculated, without limiting the length of its repeated individual chain segment, namely the value range of m is 1-40% of the chain segment total length m+n, and the value range of n is 60-99% of the chain segment total length m+n; and a $—CF_3$ group in a R group may also be replaced by a fluorobenzene group, namely the hexafluorobisphenol A may be replaced by fluorobenzene, the R group is a group that removes a phenolic hydroxyl group from the hexafluorobisphenol A, and a structural formula is as follows:

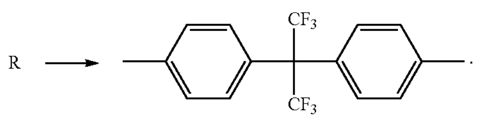

Preferably, in the step S1, the molar ratio of the 4,4'-difluorobenzophenone, hexafluorobisphenol A, 4,4'-dihydroxy p-phenylsulfide, anhydrous potassium carbonate, and 4-vinylbenzyl chloride is 0.1803:0.159075-0.201495:0.010605-0.053025:0.252:0.013104-0.065522.

In the above preparation method for the high-temperature self-crosslinking fluorine-containing polyaryletherketone, under the condition of guaranteeing that the sum of molar weights of the hexafluorobisphenol A and 4,4'-dihydroxy p-phenylsulfide is 0.2121 mol, the content of the thioether group is regulated and controlled by changing the molar fraction of the 4,4'-dihydroxy p-phenylsulfide, and the content of the end group styrene is regulated and controlled by changing the amount of the 4-vinylbenzyl chloride in the system.

Specifically, experimental data of the effect of changing the molar fraction of the 4,4'-dihydroxy p-phenylsulfide on the performance of a paint film coating layer are shown in Table 1:

the moisture and heat resistance test, the paint film surface of the original coating layer is smooth, and after the treatment under the high moisture and heat conditions, the paint film is not bubbled or fallen off, and the performance remains basically unchanged; in the wear resistance test, the scratch resistance of the original coating layer is increased from 3.822 N to 4.09 N, and after the treatment at 160° C., the scratch resistance is increased from 3.711 N to 4.07 N; and the friction coefficient is increased from 0.096 to 0.119, but the increase in friction coefficient is small and remains around 0.1.

TABLE 1

Comparison table of effects of 4,4'-dihydroxy p-phenylsulfide contents on performance of paint film coating layer

| Test item | Test standard | Comparison content | Test condition | The molar fraction of 4-vinylbenzyl chloride is 5%, and the molar fraction of 4,4'-dihydroxy p-phenylsulfide is 2.5% | The molar fraction of 4-vinylbenzyl chloride is 5%, and the molar fraction of 4,4'-dihydroxy p-phenylsulfide is 7.5% | The molar fraction of 4-vinylbenzyl chloride is 5%, and the molar fraction of 4,4'-dihydroxy p-phenylsulfide is 12.5% |
|---|---|---|---|---|---|---|
| Moisture and heat resistance | GB/T 28046.4-2011 | Coating surface condition | Original coating layer | The paint film surface is flat and smooth | | |
| | | | 47° C./96% high moisture and heat, after 72 h of treatment | The paint film is not bubbled or fallen off | | |
| | | Scratch resistance, N | Original coating layer | 3.822 | 4.084 | 4.090 |
| | | | 47° C./96% high moisture and heat, after 72 h of treatment | 3.619 | 4.041 | 4.045 |
| Oil resistance | GB/T 17948.1-2018 | Coating surface condition | Original coating layer 160° C., after 72 h of treatment | The paint film surface is flat and smooth | | |
| Wear resistance | GB/T 4074.3-2008 | Scratch resistance, N | Original coating layer | 3.822 | 4.084 | 4.090 |
| | | | 160° C., after 72 h of treatment | 3.711 | 4.063 | 4.070 |
| Friction coefficient | GB/T 4074.3-2008 | | — | 0.096 | 0.108 | 0.119 |

From Table 1, it may be seen that with the increase of 4,4'-dihydroxy p-phenylsulfide content, the oil resistance of the paint film coating layer remains basically unchanged; in Experimental data of effects of changing the molar fraction of 4-vinylbenzyl chloride on the performance are shown in Table 2:

TABLE 2

Comparison table of effects of 4-vinylbenzyl chloride contents on performance of paint film coating layer

| Test item | Test standard | Comparison content | Test condition | The molar fraction of 4-vinylbenzyl chloride is 1%, and the molar fraction of 4,4'-dihydroxy p-phenylsulfide is 7.5% | The molar fraction of 4-vinylbenzyl chloride is 2%, and the molar fraction of 4,4'-dihydroxy p-phenylsulfide is 7.5% | The molar fraction of 4-vinylbenzyl chloride is 5%, and the molar fraction of 4,4'-dihydroxy p-phenylsulfide is 7.5% |
|---|---|---|---|---|---|---|
| Moisture and heat resistance | GB/T 28046.4-2011 | Coating surface condition | Original coating layer | The paint film surface is flat and smooth | | |
| | | | 47° C./96% high moisture and heat, after 72 h of treatment | The paint film is not bubbled or fallen off | | |

TABLE 2-continued

Comparison table of effects of 4-vinylbenzyl chloride contents on performance of paint film coating layer

| Test item | Test standard | Comparison content | Test condition | The molar fraction of 4-vinylbenzyl chloride is 1%, and the molar fraction of 4,4'-dihydroxy p-phenylsulfide is 7.5% | The molar fraction of 4-vinylbenzyl chloride is 2%, and the molar fraction of 4,4'-dihydroxy p-phenylsulfide is 7.5% | The molar fraction of 4-vinylbenzyl chloride is 5%, and the molar fraction of 4,4'-dihydroxy p-phenylsulfide is 7.5% |
|---|---|---|---|---|---|---|
| | | Scratch resistance, N | Original coating layer | 3.865 | 3.928 | 4.084 |
| | | | 47° C./96% high moisture and heat, after 72 h of | 3.682 | 3.803 | 4.041 |
| Oil resistance | GB/T 17948.1-2018 | Coating surface condition | Original coating layer | The paint film surface is flat and smooth | | |
| | | | 160° C., after 72 h of treatment | | | |
| Wear resistance | GB/T 4074.3-2008 | Scratch resistance, N | Original coating layer | 3.865 | 3.928 | 4.084 |
| | | | 160° C., after 72 h of treatment | 3.782 | 3.859 | 4.063 |
| Friction coefficient | GB/T 4074.3-2008 | | — | 0.109 | 0.110 | 0.108 |

From Table 2, it may be seen that with the increase of 4-vinylbenzyl chloride content, the oil resistance of the paint film coating layer remains basically unchanged; in the moisture and heat resistance test, the paint film surface of the original coating layer is smooth, the paint film is not bubbled or fallen off after the treatment under the high moisture and heat conditions, and the performance remains basically unchanged; in the wear resistance test, the scratch resistance of the original coating layer is increased from 3.865 N to 4.084 N, and after the treatment at 160° C., the scratch resistance is increased from 3.782 N to 4.063 N; and the friction coefficient remains basically unchanged between 0.108 and 0.11.

The present application further provides a coating material containing high-temperature self-crosslinking fluorine-containing polyaryletherketone, and the coating material includes the high-temperature self-crosslinking fluorine-containing polyaryletherketone, a solvent, and a diluent; and the high-temperature self-crosslinking fluorine-containing polyaryletherketone includes one or more of the high-temperature self-crosslinking fluorine-containing polyaryletherketone containing two crosslinking groups of the styrene group and the thioether group, the high-temperature self-crosslinking fluorine-containing polyaryletherketone containing the styrene group, and the high-temperature self-crosslinking fluorine-containing polyaryletherketone containing the thioether group.

Preferably, in the coating material, calculated by the total mass of the coating material, the amount of the fluorine-containing polyaryletherketone containing two crosslinking groups of the styrene group and the thioether group is 10-60 phr, the amount of the high-temperature self-crosslinking polyaryletherketone containing the styrene group is 10-60 phr, the amount of the high-temperature self-crosslinking polyaryletherketone containing the thioether group is 10-60 phr, the amount of the solvent is 30-70 phr, and the amount of the diluent is 10-40 phr.

Preferably, the coating material further includes a flatting agent and a lubricant, the amount of the flatting agent is 0.1-2.0 phr, and the amount of the lubricant is 1-10 phr.

The present application further provides a preparation method for a coating material containing high-temperature self-crosslinking fluorine-containing polyaryletherketone, and the specific steps are as follows.

S1, synthesis of high-temperature self-crosslinking fluorine-containing polyaryletherketone containing two crosslinking groups of styrene group and thioether group:

Raw materials 4,4'-difluorobenzophenone, hexafluorobisphenol A, 4,4'-dihydroxy p-phenylsulfide, anhydrous potassium carbonate, and N-methylpyrrolidone are added sequentially to a container equipped with a mechanical stirring device, a thermometer, a water separator, and a nitrogen gas fed, it is stirred and the temperature is raised to 115-125° C., it is reacted for 2-3 h to remove water generated during the reaction, and then the temperature is raised to 175-190° C., and it is continuously reacted for 2.5-3.5 h; and after a high-temperature polymerization reaction is completed, a reaction system is cooled to a room temperature, 4-vinylbenzyl chloride is added and stirred at the room temperature for 20-25 h until the reaction is completed, a reaction product is poured into deionized water, the product is crushed after being cooled, it is filtered after being washed with ethanol and deionized water, and then it is dried with blast air at 60° C. for 4-8 h, and vacuum-dried at 55-65° C. for 16-20 h, to obtain high-temperature self-crosslinking fluorine-containing polyaryletherketone white polymer powder with the styrene group as an end group and the thioether group contained in the molecular chain, and the yield is 95%.

S2, synthesis of high-temperature self-crosslinking fluorine-containing polyaryletherketone containing styrene group:

4,4'-difluorobenzophenone, hexafluorobisphenol A, anhydrous potassium carbonate, and reactive solvent NMP are added sequentially to a container equipped with a mechanical stirring device, a thermometer, a water separator, and a nitrogen gas fed, it is stirred and the temperature is raised to 115-125° C., it is reacted for 2-3 h to remove water generated during the reaction, and then the temperature is raised to 175-190° C., and it is continuously reacted for 2.5-3.5 h; and after a high-temperature polymerization reaction is completed, a reaction system is cooled to a room temperature, 4-vinylbenzyl chloride is added and stirred at the room temperature for 20-25 h until the reaction is completed, a reaction product is poured into deionized water, the product is crushed after being cooled, it is filtered after being washed with ethanol and deionized water, and then it is dried with blast air at 60° C. for 4-8 h, and vacuum-dried at 55-65° C. for 16-20 h, to obtain high-temperature self-crosslinking fluorine-containing polyaryletherketone white polymer powder containing the styrene group, and the yield is 95%.

A reaction formula for the preparation process of the high-temperature self-crosslinking fluorine-containing polyaryletherketone containing the styrene group is as follows:

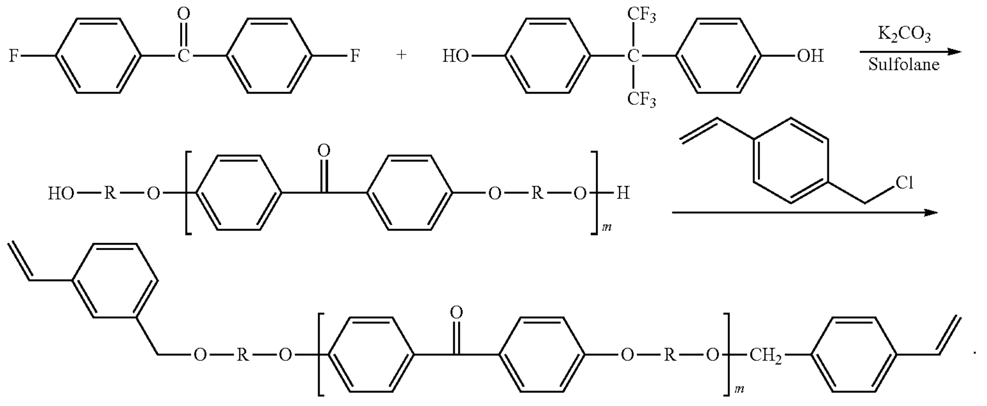

Where, the value range of m is an integer greater than or equal to 1, an —CF3 group in a R group may also be replaced by a fluorobenzene group, namely the hexafluorobisphenol A may be replaced by fluorobenzene, the R group is a group that removes a phenolic hydroxyl group from the hexafluorobisphenol A, and a structural formula is as follows:

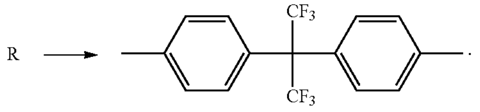

In the above preparation method for the high-temperature self-crosslinking fluorine-containing polyaryletherketone containing the styrene group, the molar fraction of 4-vinylbenzyl chloride is sequentially changed to 1%, 2%, and 5%, while other preparation parameters remain unchanged. The high-temperature self-crosslinking fluorine-containing polyaryletherketone white polymer powder containing the styrene group with the molar fractions of 1%, 2%, and 5% is obtained respectively, and the yield is 95%.

S3, synthesis of high-temperature self-crosslinking fluorine-containing polyaryletherketone containing thioether group:

Raw materials 4,4'-difluorobenzophenone, hexafluorobisphenol A, crosslinking agent 4,4'-dihydroxy p-phenylsulfide, anhydrous potassium carbonate, and reactive solvent sulfolane are added sequentially to a container equipped with a mechanical stirring device, a thermometer, a water separator, and a nitrogen gas fed, it is stirred and the temperature is raised to 115-125° C., it is reacted for 2-3 h to remove water generated during the reaction, and then the temperature is raised to 175-190° C., and it is continuously reacted for 2.5-3.5 h; and after a high-temperature polymerization reaction is completed, a reaction system is cooled to a room temperature, a reaction product is poured into deionized water, the product is crushed after being cooled, it is filtered after being washed with ethanol and deionized water, and then it is dried with blast air at 60° C. for 4-8 h, and vacuum-dried at 55-65° C. for 16-20 h, to obtain high-temperature self-crosslinking fluorine-containing polyaryletherketone white polymer powder containing the thioether group, and the yield is 95%.

A reaction formula for the preparation process of the high-temperature self-crosslinking fluorine-containing polyaryletherketone containing the thioether group is as follows:

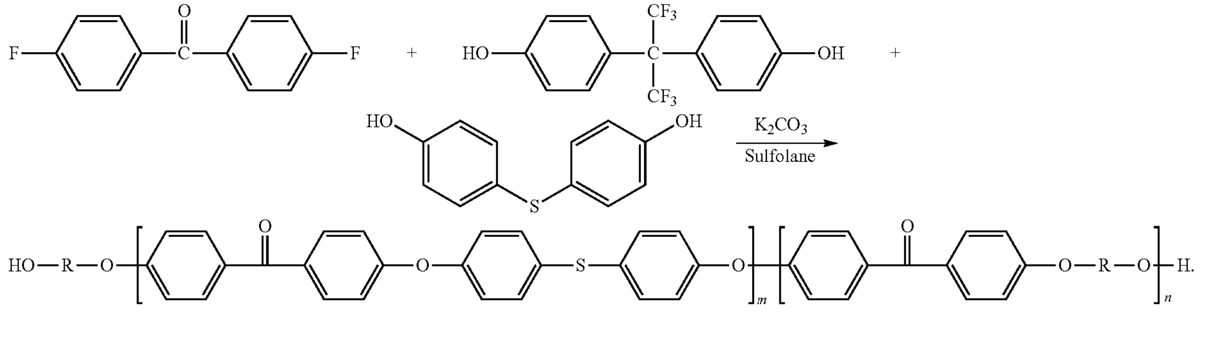

Where, the value range of m is 1-40% (m/m+n), and the value range of n is 60-99% (n/m+n). Preferably, the fluorine-containing polyaryletherketone may be randomly copolymerized, so only the proportion of the content of each repeated group in the total length of the molecular chain segment is calculated, without limiting the length of its repeated individual chain segment, namely the value range of m is 1-40% of the chain segment total length m+n, and the value range of n is 60-99% of the chain segment total length m+n; and a —CF3 group in a R group may also be replaced by a fluorobenzene group, namely the hexafluorobisphenol A may be replaced by fluorobenzene, the R group is a group that removes a phenolic hydroxyl group from the hexafluorobisphenol A, and a structural formula is as follows:

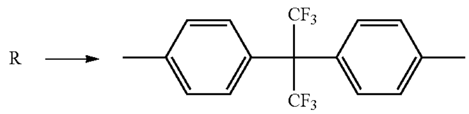

In the above preparation method for the high-temperature self-crosslinking fluorine-containing polyaryletherketone containing the thioether group, under the condition of guaranteeing that the sum of molar weights of the hexafluorobisphenol A and 4,4'-dihydroxy p-phenylsulfide is mol, the molar fraction of 4,4'-dihydroxy p-phenylsulfide is changed to 2.5%, 7.5%, and 12.5%, and other preparation parameters remain unchanged, to obtain the high-temperature self-crosslinking fluorine-containing polyaryletherketone white polymer powder containing the thioether group with the molar fractions of 2.5%, 7.5%, and 12.5% respectively, and the yield is 95%.

S4, preparation of coating material: high-temperature self-crosslinking fluorine-containing polyaryletherketone prepared in the steps S1, S2, and S3 is dissolved in a solvent, the amount of the solvent is 30-70 phr, the solid content range of the high-temperature self-crosslinking fluorine-containing polyaryletherketone is between 10-50 phr, and the dissolution process is performed within the range of 20-40° C. After the three types of the high-temperature self-crosslinking fluorine-containing polyaryletherketone are completely dissolved, an additive is added and stirred evenly, the additive includes a diluent, and the amount of the diluents is 10-40 phr.

While a coating material of fluorine-containing polyaryletherketone containing any one or two functional groups needs to be prepared, the three types of the high-temperature self-crosslinking fluorine-containing polyaryletherketone may be replaced with one or two fluorine-containing polyaryletherketone containing corresponding functional groups, and other preparation methods remain unchanged. Namely, the high-temperature self-crosslinking fluorine-containing polyaryletherketone added in the step S4 may be a mixture of one or any two of the high-temperature self-crosslinking fluorine-containing polyaryletherketone containing two crosslinking groups of the styrene group and the thioether group prepared in the step S1, the high-temperature self-crosslinking fluorine-containing polyaryletherketone containing the styrene group prepared in the step S2, and the high-temperature self-crosslinking fluorine-containing polyaryletherketone containing the thioether group prepared in the step S3.

Preferably, in the step S2, the molar ratio of the 4,4'-difluorobenzophenone, hexafluorobisphenol A, anhydrous potassium carbonate, and 4-vinylbenzyl chloride is 0.1803:0.159075-0.201495:0.252:0.013104-0.065522.

Preferably, in the step S3, the molar ratio of the 4,4'-difluorobenzophenone, hexafluorobisphenol A, 4,4'-dihydroxy p-phenylsulfide, and anhydrous potassium carbonate is 0.1803:0.159075-0.21495:0.010605-0.053025:0.252.

Preferably, in the step S4, the solvent is a mixture of one or more of chloroform, 1,2-dichloroethane, tetrahydrofuran, cyclohexanone, N,N-dimethylformamide, N-methylpyrrolidone, and dimethylacetamide.

The diluent in the step S4 is a mixture of one or more of toluene, xylene, hexane, cyclohexane, heptane, octane, and decane.

Preferably, the additive further includes a lubricant and a flatting agent.

Preferably, the lubricant is a mixture of one or more of polyethylene wax, polyester wax, polyamide wax, polytetrafluoroethylene wax, and palm wax.

Preferably, the flatting agent is a mixture of one or more of low-molecular-weight acrylic copolymer, polyether-modified polysiloxane, and silicone polymer.

Preferably, the low-molecular-weight acrylic copolymer refers to an acrylic copolymer with a chain segment length of 500-3000. The polyether-modified polysiloxane is a mixture of one or more of polyether-grafted dimethyl polysiloxane with a chain segment length of 2000-5000, polyether-modified heptamethyltrisiloxane surfactant (TRSE), polyether-modified octamethyltetrasiloxane surfactant (TESE), S-7-type polyether-modified polysiloxane defoamer, S-8-type polyether-modified polysiloxane defoamer, and Si—C-type polyether-modified polysiloxane defoamer. The silicone polymer is a mixture of one or more of calcium carbonate-filled silicone sealant, modified silicone sealing material Caneca Ms polymer, and silicone-polyimide-synthesized halogen-free elastomer-type block copolymer (SILTEM) with a chain segment length of 2000-5000. In the present application, the calcium carbonate-filled silicone sealant is added as an anti-wear coating layer material to the coating material, as to increase the wear resistance of the coating material.

Compared to existing technologies, the present application has the following advantages.

The high-temperature self-crosslinking fluorine-containing polyaryletherketone of the present application introduces the crosslinking groups of the styrene group and the thioether group into the molecular chain of the fluorine-containing polyaryletherketone, its end group is the styrene group, and the thioether group is contained in the middle of the molecular chain. Compared with the polyaryletherketone, the fluorine-containing polyaryletherketone may be used as a coating material matrix resin applied in the coating material because a fluorine substituent is introduced so that it may be dissolved in the conventional organic solvent; under normal temperature conditions, its linear structure may be dissolved in the conventional organic solvent, and during post-coating heat treatment, a thioether bond and a vinyl group in the coating film may undergo self-crosslinking, the coating layer resin becomes a three-dimensional crosslinking network structure, so that the oil resistance and hydrolysis resistance at a high temperature and the moisture and heat resistance of the coating layer are significantly improved, thereby the long-term requirements of the special coating layer in the harsh working environments such as high temperature, high pressure, and high humidity are satisfied; and the coating material prepared by the high-temperature self-crosslinking fluorine-containing polyaryletherketone of the present application may be stably used in the environments with the high temperature above 150° C., 2 atmospheric pressures, and the relative humidity of above 70%.

BRIEF DESCRIPTION OF THE DRAWINGS

The FIGURE is a reaction formula diagram of a preparation process of high-temperature self-crosslinking fluorine-containing polyaryletherketone of the present application.

DETAILED DESCRIPTION OF THE EMBODIMENTS

Technical schemes of the present application are clearly and completely described below in combination with specific implementation modes. Apparently, embodiments described are only a part of the embodiments of the present application, not all of the embodiments.

Embodiment 1: this embodiment provides a synthesis method for high-temperature self-crosslinking fluorine-containing polyaryletherketone containing two crosslinking groups of a styrene group and a thioether group.

The reaction formula is shown in the FIGURE. Raw materials 46.2849 g (0.21 mol) of 4,4'-difluorobenzophenone, 61.8543 g (0.1803 mol) of hexafluorobisphenol A, 6.941 g (0.0318 mol) of crosslinking agent 4,4'-dihydroxy p-phenylsulfide, 35.1808 g (0.252 mol) of anhydrous potassium carbonate, and 420 ml of reactive solvent NMP (N-methylpyrrolidone) are added sequentially to 1000 ml of a four-port flask equipped with a mechanical stirring device, a thermometer, a water separator, and a nitrogen gas fed, it is stirred and the temperature is raised to 120° C., it is reacted for 2 h to remove water generated during the reaction, and then the temperature is raised to 180° C., and it is continuously reacted for 3 h; and after a high-temperature polymerization reaction is completed, a reaction system is cooled to a room temperature, 3.2 g (0.021 mol) of 4-vinylbenzyl chloride is added and stirred at the room temperature for 24 h until the reaction is completed, a reaction product is poured into deionized water, the product is crushed after being cooled, it is filtered after being washed with ethanol and deionized water, and then it is dried with blast air at 60° C. for 6 h, and vacuum-dried at 60° C. for 18 h, to obtain high-temperature self-crosslinking fluorine-containing polyaryletherketone white polymer powder with the styrene group as an end group and the thioether group contained in the molecular chain, in which the molar fraction of the styrene group is 5%, and the molar fraction of the thioether group is 7.5%; and the yield is 95%.

Embodiment 2: this embodiment provides a synthesis method for high-temperature self-crosslinking fluorine-containing polyaryletherketone containing a styrene group.

46.2849 g (0.21 mol) of 4,4'-difluorobenzophenone, 72.7698 g (0.2121 mol) of hexafluorobisphenol A, 35.1808 g (0.252 mol) of anhydrous potassium carbonate, and 420 ml of reactive solvent NMP are added sequentially to 1000 ml of a four-port flask equipped with a mechanical stirring device, a thermometer, a water separator, and a nitrogen gas fed, it is stirred and the temperature is raised to 120° C., it is reacted for 2 h to remove water generated during the reaction, and then the temperature is raised to 180° C., and it is continuously reacted for 3 h; and after a high-temperature polymerization reaction is completed, a reaction system is cooled to a room temperature, 3.2 g (0.021 mol) of 4-vinylbenzyl chloride is added and stirred at the room temperature for 20-25 h until the reaction is completed, a reaction product is poured into deionized water, the product is crushed after being cooled, it is filtered after being washed with ethanol and deionized water, and then it is dried with blast air at 60° C. for 6 h, and vacuum-dried at 60° C. for 18 h, to obtain high-temperature self-crosslinking fluorine-containing polyaryletherketone white polymer powder containing the styrene group, in which the molar fraction of the styrene group is 5%, and the yield is 95%.

Embodiment 3: this embodiment provides a synthesis method for high-temperature self-crosslinking fluorine-containing polyaryletherketone containing a thioether group.

Raw materials 46.2849 g (0.21 mol) of 4,4'-difluorobenzophenone, 61.8543 g (0.1803 mol) of hexafluorobisphenol A, 6.941 g (0.0318 mol) of crosslinking agent 4,4'-dihydroxy p-phenylsulfide, 35.1808 g (0.252 mol) of anhydrous potassium carbonate, and 420 ml of reactive solvent sulfolane are added sequentially to 1000 ml of a four-port flask equipped with a mechanical stirring device, a thermometer, a water separator, and a nitrogen gas fed, it is stirred and the temperature is raised to 120° C., it is reacted for 2 h to remove water generated during the reaction, and then the temperature is raised to 180° C., and it is continuously reacted for 3 h; and after a high-temperature polymerization reaction is completed, a reaction system is cooled to a room temperature, a reaction product is poured into deionized water, the product is crushed after being cooled, it is filtered after being washed with ethanol and deionized water, and then it is dried with blast air at 60° C. for 6 h, and vacuum-dried at 60° C. for 18 h, to obtain high-temperature self-crosslinking fluorine-containing polyaryletherketone white polymer powder containing the thioether group, in which the molar fraction of the thioether group is 7.5%, and the yield is 95%.

Contrast example 1: this embodiment provides a preparation method for fluorine-containing polyaryletherketone without containing a crosslinking agent.

Raw materials 46.2849 g (0.21 mol) of 4,4'-difluorobenzophenone, 72.7698 g (0.2121 mol) of hexafluorobisphenol A, 35.1808 g (0.0318 mol) of crosslinking agent 4,4'-dihydroxy p-phenylsulfide, 35.1808 g (0.252 mol) of anhydrous potassium carbonate, and 420 ml of reactive solvent sulfolane are added sequentially to 1000 ml of a four-port flask equipped with a mechanical stirring device, a thermometer, a water separator, and a nitrogen gas fed, it is stirred and the temperature is raised to 120° C., it is reacted for 2 h to remove water generated during the reaction, and then the temperature is raised to 180° C., and it is continuously reacted for 3 h; and after a high-temperature polymerization reaction is completed, a reaction product is poured into deionized water, the product is crushed after being cooled, it is filtered after being washed with ethanol and deionized water, and then it is dried with blast air at 60° C. for 6 h, and vacuum-dried at 60° C. for 18 h, to obtain fluorine-containing polyaryletherketone white polymer powder without containing the crosslinking agent, and the yield is 95%.

The fluorine-containing polyaryletherketone prepared in the above Embodiments 1-3 and Contrast example 1 is respectively used to prepare a coating material according to the aforementioned preparation method for the coating material containing the high-temperature self-crosslinking fluorine-containing polyaryletherketone.

Specifically, in the aforementioned preparation method for the coating material containing the high-temperature self-crosslinking fluorine-containing polyaryletherketone, the method for preparing the coating material by using Embodiment 1 is that the high-temperature self-crosslinking fluorine-containing polyaryletherketone added in the step S4 is prepared only for Embodiment 1; the method for preparing the coating material by using Embodiment 2 is that the high-temperature self-crosslinking fluorine-containing polyaryletherketone added in the step S4 is prepared only for Embodiment 2; the method for preparing the coating material by using Embodiment 3 is that the high-temperature self-crosslinking fluorine-containing polyaryletherketone added in the step S4 is prepared only for Embodiment 3; and the method for preparing the coating material by using Contrast example 1 is that the fluorine-containing polyaryletherketone added in the step S4 is prepared only for Contrast example 1.

The amounts of the fluorine-containing polyaryletherketone added corresponding to the coating materials prepared in Embodiments 1-3 and Contrast example 1 are all 50 phr, the amount of the solvent N-methylpyrrolidone is 40 phr, the amount of the diluent hexane is 20 phr, and the amount of the flatting agent low-molecular-weight acrylic ester is 0.15 phr, product model: EPITEX 66, and seller: Wuhan ZeShanCheng Biomedical Technology Co., Ltd.; and the amount of the lubricant polyether-grafted dimethyl polysiloxane with the chain segment length of 2000-5000 is 3 phr, product model: SP-983, and seller: Guangzhou Xinguan Chemical Technology Co., Ltd. In addition, the low-molecular-weight acrylic ester may also adopt ACRYLATES COPOLYMER sold by Beijing HuameiHuli Biochemical Co., Ltd.; and the polyether-grafted dimethyl polysiloxane with the chain segment length of 2000-5000 may also adopt SR-202 sold by Guangdong Rebon High-tech Materials Co., Ltd. The performance comparison table of the coating materials prepared is shown in Table 3.

resistance of Embodiment 1 is the best, and at least 4.063 N of the friction force is required to wear or damage the coating layer in both the original coating layer and after the high-temperature post-treatment, so the wear resistance is nearly doubled. In terms of the oil resistance, the coating surface of Contrast example 1 without containing the styrene group and the thioether group is not flat after the high-temperature treatment, it is indicated that in the high-temperature oil resistance experiment of the coating material, the paint layer is partially fallen off, and the oil resistance is relatively poor. For the coating material prepared from the fluorine-containing polyaryletherketone containing the styrene group or the thioether group, under the conditions of both the original coating layer and after the high-temperature post-treatment, the paint film surface is smooth and flat, and the paint film is not fallen off, it is apparent that the oil resistance is greatly improved. In terms of the moisture and heat resistance, the scratch resistance of Contrast example without containing the styrene group and the thioether group is relatively low in both the original coating layer and after the high-temperature post-treatment, especially after the high moisture and heat treatment, only 2.071 N of the friction force is needed to damage the coating layer; for the coating material prepared from the fluorine-containing polyaryletherketone containing the styrene group or the thioether group, under the conditions of both the original coating layer and after the high-temperature post-treatment, the friction forces required to wear the coating layer are all greater than 3.2 N, it is apparent that the moisture and heat resistance is improved; and the moisture and heat resistance of Embodiment 1 is the best, at least 4.041 N of the friction force is required to wear or damage

TABLE 3

Performance comparison table of coating materials prepared from fluorine-containing polyaryletherketone in Embodiments 1-3 and Contrast example 1

| Test item | Test standard | Comparison content | Test condition | Contrast example 1 | Embodiment 2 | Embodiment 3 | Embodiment 1 |
|---|---|---|---|---|---|---|---|
| Moisture and heat resistance | GB/T 28046.4-2011 | Coating surface condition | Original coating layer | The paint film surface is flat and smooth | | | |
| | | | 47° C./96% high moisture and heat, after 72 h of treatment | The paint film is partially bubbled or fallen off | The paint film is not bubbled or fallen off | | |
| | | Scratch resistance, N | Original coating layer | 2.672 | 3.458 | 3.743 | 4.084 |
| | | | 47° C./96% high moisture and heat, after 72 h of treatment | 2.071 | 3.246 | 3.512 | 4.041 |
| Oil resistance | GB/T 17948.1-2018 | Coating surface condition | Original coating layer | The paint film surface is flat and smooth | | | |
| | | | 160° C., after 72 h of treatment | The paint film surface is not flat | The paint film surface is flat and smooth | | |
| Wear resistance | GB/T 4074.3-2008 | Scratch resistance, N | Original coating layer | 2.672 | 3.458 | 3.743 | 4.084 |
| | | | 160° C., after 72 h of treatment | 1.876 | 3.196 | 3.625 | 4.063 |
| Friction coefficient | GB/T 4074.3-2008 | | — | 0.108 | 0.109 | 0.109 | 0.108 |

It may be seen from Table 3 that: in terms of the wear resistance, the wear resistance of Contrast example 1 without the styrene group and the thioether group is relatively low in both the original coating layer and after the high-temperature post-treatment, especially while only 1.876 N of a friction force is needed to damage the coating layer after the high-temperature treatment; the coating material prepared from the fluorine-containing polyaryletherketone containing the styrene group or the thioether group, under the conditions of both the original coating layer and after the high-temperature post-treatment, requires the friction force greater than 3.1 N to wear the coating layer, and it is apparent that the wear resistance is improved; and the wear the coating layer in both the original coating layer and after the high-temperature post-treatment, and the moisture and heat resistance is nearly doubled. There is no significant difference between the friction coefficients of the coating materials prepared in Embodiments 1-3 and Contrast example 1, and they are all around 0.108.

The high-temperature self-crosslinking fluorine-containing polyaryletherketone of the present application introduces the crosslinking groups of the styrene group and the thioether group into the molecular chain of the fluorine-containing polyaryletherketone, as to form the fluorine-containing polyaryletherketone with the styrene group as the end group and the thioether group contained in the middle of the molecular chain. Compared with the polyaryletherketone, the fluorine-containing polyaryletherketone of the present application may be used as a coating material matrix resin applied in the coating material because a fluorine substituent is introduced so that it may be dissolved in the conventional organic solvent; and under normal temperature conditions, its linear structure may be dissolved in the conventional organic solvent, and during post-coating heat treatment, a thioether bond and a vinyl group in the coating film may undergo self-crosslinking, the coating layer resin becomes a three-dimensional crosslinking network structure, so that the oil resistance and hydrolysis resistance at a high temperature and the moisture and heat resistance of the coating layer are significantly improved, thereby the long-term requirements of the special coating layer in the harsh working environments such as high temperature, high pressure, and high humidity are satisfied. The coating material prepared by the high-temperature self-crosslinking fluorine-containing polyaryletherketone of the present application may be stably used in the environments with the high temperature above 150° C., 2 atmospheric pressures, and the relative humidity of above 70%. The coating material or paint prepared by using the fluorine-containing polyaryletherketone of the present application also has the advantages of the fluorine-containing polyaryletherketone.

The above implementation modes are only preferred implementation modes of the present application, and may not be used to limit the scope of protection of the present application. Any non-substantive changes and replacements made by those skilled in the art on the basis of the present application all belong to the scope of protection claimed by the present application.

The invention claimed is:

1. A preparation method for a coating material containing high-temperature self-crosslinking fluorine-containing polyaryletherketone, wherein it is performed according to the following steps:

S1, synthesis of high-temperature self-crosslinking fluorine-containing polyaryletherketone containing two crosslinking groups of styrene group and thioether group:

adding raw materials 4,4'-difluorobenzophenone, hexafluorobisphenol A, 4,4'-dihydroxy p-phenylsulfide, anhydrous potassium carbonate, and N-methylpyrrolidone sequentially to a container equipped with a mechanical stirring device, a thermometer, a water separator, and a nitrogen gas feed, stirring and raising the temperature to 115-125° C., reacting for 2-3 h to remove water generated during the reaction, and then raising the temperature to 175-190° C., and continuously reacting for 2.5-3.5 h; and after a high-temperature polymerization reaction is completed, cooling a reaction system to a room temperature, adding 4-vinylbenzyl chloride and stirring at the room temperature for 20-25 h until the reaction is completed, pouring a reaction product into deionized water, crushing the product after being cooled, filtering after being washed with ethanol and deionized water, and then drying with blast air at 60° C. for 4-8 h, and vacuum-drying at 55-65° C. for 16-20 h;

a structural formula of the high-temperature self-crosslinking fluorine-containing polyaryletherketone containing two crosslinking groups of the styrene group and the thioether group is:

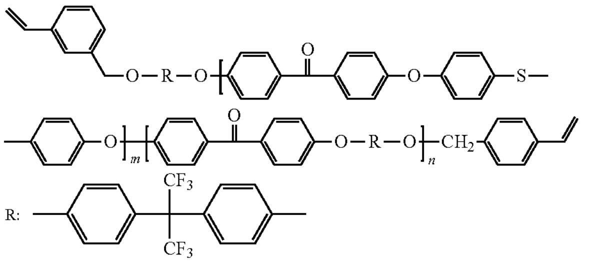

wherein, the value range of m being 1-40%, the value range of n being 60-99%, and R being a group that removes a phenolic hydroxyl group from hexafluorobisphenol A;

S2, synthesis of high-temperature self-crosslinking fluorine-containing polyaryletherketone containing styrene group:

adding 4,4'-difluorobenzophenone, hexafluorobisphenol A, anhydrous potassium carbonate, and N-methylpyrrolidone sequentially to a container equipped with a mechanical stirring device, a thermometer, a water separator, and a nitrogen gas feed, stirring and raising the temperature to 115-125° C., reacting for 2-3 h to remove water generated during the reaction, and then raising the temperature to 175-190° C., and continuously reacting for 2.5-3.5 h; and after a high-temperature polymerization reaction is completed, cooling a reaction system to a room temperature, adding 4-vinylbenzyl chloride and stirring at the room temperature for 20-25 h until the reaction is completed, pouring a reaction product into deionized water, crushing the product after being cooled, filtering after being washed with ethanol and deionized water, and then drying with blast air at 60° C. for 4-8 h, and vacuum-drying at 55-65° C. for 16-20 h;

S3, synthesis of high-temperature self-crosslinking fluorine-containing polyaryletherketone containing thioether group:

adding raw materials 4,4'-difluorobenzophenone, hexafluorobisphenol A, 4,4'-dihydroxy p-phenylsulfide, anhydrous potassium carbonate, and sulfolane sequentially to a container equipped with a mechanical stirring device, a thermometer, a water separator, and a nitrogen gas feed, stirring and raising the temperature to 115-125° C., reacting for 2-3 h to remove water generated during the reaction, and then raising the temperature to 175-190° C., and continuously reacting for 2.5-3.5 h; and after a high-temperature polymerization reaction is completed, cooling a reaction system, pouring a reaction product into deionized water, crushing the product after being cooled, filtering after being washed with ethanol and deionized water, and then drying with blast air at 60° C. for 4-8 h, and vacuum-drying at 55-65° C. for 16-20 h; and S4, preparation of coating material: dissolving high-temperature self-crosslinking fluorine-containing polyaryletherketone in a solvent, wherein the high-temperature self-crosslinking fluorine-containing polyaryletherketone comprising one or more of the high-temperature self-crosslinking fluorine-containing polyaryletherketone containing two crosslinking groups of the styrene group and the thioether group, the high-temperature self-crosslinking fluorine-containing polyaryletherketone containing the styrene group, and the high-temperature self-crosslinking fluorine-containing polyaryletherketone containing the thioether group, and the solid content range of the high-temperature self-crosslinking fluorine-containing polyaryletherketone being between 10-50 parts per hundred resin; performing the dissolution process within the range of 20-40° C., and after the high-temperature self-crosslinking fluorine-containing polyaryletherketone is completely dissolved, adding a diluent, a flatting agent, and a lubricant and stirring evenly.

2. The preparation method for the coating material containing the high-temperature self-crosslinking fluorine-containing polyaryletherketone as claimed in claim 1, wherein in the step S1, the molar ratio of the 4,4'-difluorobenzophenone, hexafluorobisphenol A, 4,4'-dihydroxy p-phenylsulfide, anhydrous potassium carbonate, and 4-vinylbenzyl chloride is 0.1803:0.159075-0.201495:0.010605-0.053025:0.252:0.013104-0.065522.

3. The preparation method for the coating material containing the high-temperature self-crosslinking fluorine-containing polyaryletherketone as claimed in claim 1, wherein in the step S2, the molar ratio of the 4,4'-difluorobenzophenone, hexafluorobisphenol A, anhydrous potassium carbonate, and 4-vinylbenzyl chloride is 0.1803:0.159075-0.201495:0.252:0.013104-0.065522.

4. The preparation method for the coating material containing the high-temperature self-crosslinking fluorine-containing polyaryletherketone as claimed in claim 1, wherein in the step S3, the molar ratio of the 4,4'-difluorobenzophenone, hexafluorobisphenol A, 4,4'-dihydroxy p-phenylsulfide, and anhydrous potassium carbonate is 0.1803: 0.159075-0.201495:0.010605-0.053025: 0.252.

5. The preparation method for the coating material containing the high-temperature self-crosslinking fluorine-containing polyaryletherketone as claimed in claim 1, wherein in the step S4, calculated by the total mass of the coating material, the amount of the high-temperature self-crosslinking fluorine-containing polyaryletherketone is 10-60 parts per hundred resin, the amount of the solvent is 30-70 parts per hundred resin, the amount of the diluent is 10-40 parts per hundred resin; the amount of the flatting agent is 0.1-2.0 parts per hundred resin, and the amount of the lubricant is 1-10 parts per hundred resin.

6. The preparation method for the coating material containing the high-temperature self-crosslinking fluorine-containing polyaryletherketone as claimed in claim 1, wherein in the step S4, the solvent is a mixture of one or more of chloroform, 1,2-dichloroethane, tetrahydrofuran, cyclohexanone, N,N-dimethylformamide, N-methylpyrrolidone, and dimethylacetamide;

the diluent is a mixture of one or more of toluene, xylene, hexane, cyclohexane, heptane, octane, and decane;

the lubricant is a mixture of one or more of polyethylene wax, polyester wax, polyamide wax, polytetrafluoroethylene wax, and palm wax; and the flatting agent is a mixture of one or more of low-molecular-weight acrylic copolymer, polyether-modified polysiloxane, and silicone polymer.

7. The preparation method for the coating material containing the high-temperature self-crosslinking fluorine-containing polyaryletherketone as claimed in claim 6, wherein the low-molecular-weight acrylic copolymer is an acrylic acid-hydroxypropyl acrylate copolymer with a chain segment length of 500-3000; the polyether-modified polysiloxane is a mixture of one or more of polyether-grafted dimethyl polysiloxane with a chain segment length of 2000-5000, polyether-modified heptamethyltrisiloxane surfactant TRSE, polyether-modified octamethyltetrasiloxane surfactant, and polyether-modified polysiloxane defoamer; and the silicone polymer is a mixture of one or more of calcium carbonate-filled silicone sealant, modified silicone sealing material polymer, and silicone-polyimide-synthesized halogen-free elastomer-type block copolymer with a chain segment length of 2000-5000.

* * * * *